D. M. MEFFORD.
Preserving Fruits, Vegetables, &c.
No. 134,390.                                   Patented Dec. 31, 1872.
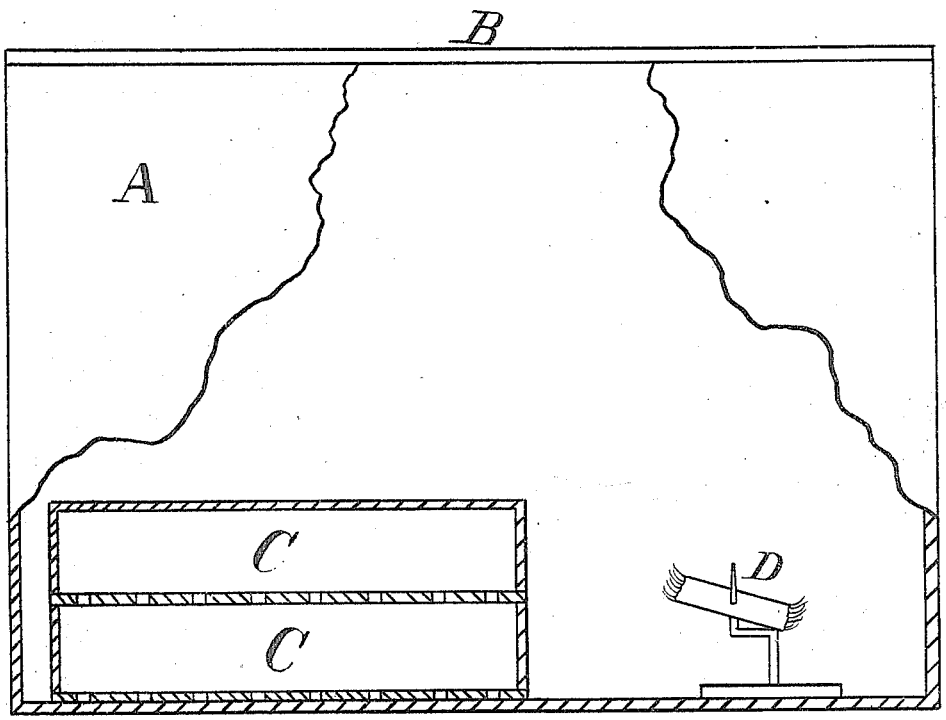

UNITED STATES PATENT OFFICE.

DAVID M. MEFFORD, OF HURON COUNTY, OHIO.

IMPROVEMENT IN PRESERVING FRUITS, VEGETABLES, &c.

Specification forming part of Letters Patent No. 134,390, dated December 31, 1872.

*To all whom it may concern:*

Be it known that I, DAVID M. MEFFORD, of the county of Huron, in the State of Ohio, have invented a new and useful Method for Preserving Fruits and Vegetables from Fermenting; and I hereby declare the following to be a true and exact description thereof, reference being had to the drawing hereto attached with the letters of reference marked thereon and made a part of this specification.

The nature of my invention consists in the discovery that when fruits or vegetables have been treated in a raw or uncooked condition with sulphurous-acid gas for the purpose of preserving them, it is necessary that they should be kept covered with water or other liquid, and that there is no necessity of heating the fruits or vegetables; neither is it necessary that the water or liquid should be heated; on the contrary, I find that fruits and vegetables are preserved much better when treated with sulphurous acid if the water or liquid used for covering them is put on entirely cold, the only exception being cucumber pickles, which cannot, in this way, be preserved.

To enable others skilled in the art to construct apparatus and use my invention, I will proceed to describe the same.

In the accompanying drawing, A is a box, with lid B nicely fitted to it. The joints of the box should be very close, especially near the bottom, to prevent the gas from leaking out. C C represent frames with grated bottoms, for holding the fruits or vegetables. D is a sulphur match, made by dipping cloth or paper into melted sulphur.

In operating the apparatus, the frames C C are filled with fruits or vegetables which have previously been prepared the same as they are for canning, and placed in the box, one frame placed on top of the other, the sulphur match ignited, and the lid B adjusted. The box should be kept closed until the fruits or vegetables have imbibed a sufficiency of the gas to prevent fermentation. The time required to do this is from five to fifteen minutes, peaches requiring only about five minutes, while beans and other vegetables require from ten to fifteen minutes. The fruit or vegetables are then placed in a keg or barrel. When the keg or barrel is full the head is adjusted water-tight, and cold water or other cold liquid poured into the bung until all the interstices among the fruit or vegetables are filled. The barrel or keg is then bunged up and stored away in a common cellar.

Claim.

What I claim as new, of my invention, and desire to secure by Letters Patent, is—

The treating of fruits or vegetables with sulphurous-acid gas in a raw or uncooked condition and then covering them with cold water or other cold liquid for the purpose of preserving the same, substantially as set forth in the foregoing specification.

DAVID M. MEFFORD.

Witnesses:
MASON G. SMITH,
HENRY I. COE.